No. 827,660. PATENTED JULY 31, 1906.
W. B. PEARSON & C. E. ROBERTS.
MECHANISM FOR FEEDING BARS OF STOCK.
APPLICATION FILED OCT. 18, 1904.

6 SHEETS—SHEET 1.

Witnesses:—

Inventors:
Walter B. Pearson
Charles E. Roberts
by
Atty.

No. 827,660. PATENTED JULY 31, 1906.
W. B. PEARSON & C. E. ROBERTS.
MECHANISM FOR FEEDING BARS OF STOCK.
APPLICATION FILED OCT. 18, 1904.

6 SHEETS—SHEET 2.

No. 827,660. PATENTED JULY 31, 1906.
W. B. PEARSON & C. E. ROBERTS.
MECHANISM FOR FEEDING BARS OF STOCK.
APPLICATION FILED OCT. 18, 1904.

6 SHEETS—SHEET 4.

Witnesses:
Louis M. F. Whitehead
Chas. B. Gillson.

Inventors:
Walter B. Pearson
Charles E. Roberts
by Chas. E. Waldo,
Atty.

No. 827,660. PATENTED JULY 31, 1906.
W. B. PEARSON & C. E. ROBERTS.
MECHANISM FOR FEEDING BARS OF STOCK.
APPLICATION FILED OCT. 18, 1904.
6 SHEETS—SHEET 5.
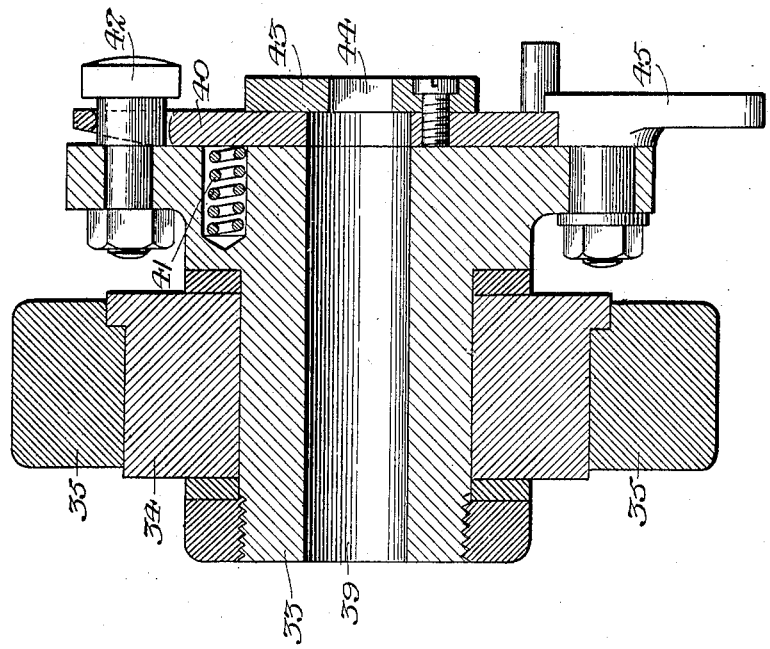
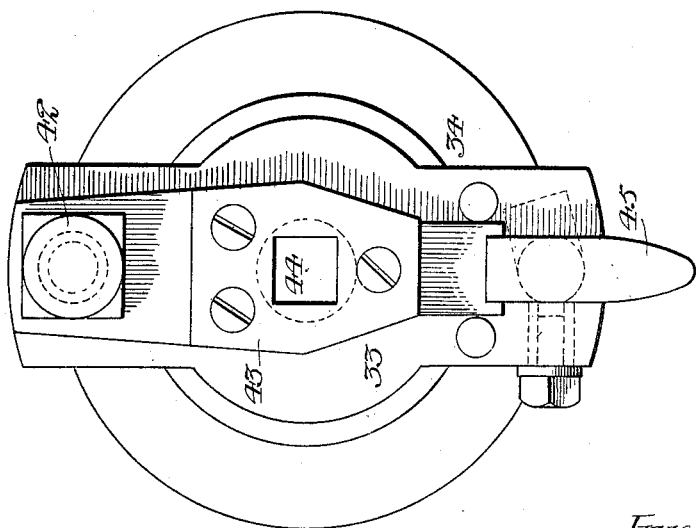
Witnesses:—
Inventors.
Walter B. Pearson
Charles E. Roberts
by:—
Atty.

No. 827,660. PATENTED JULY 31, 1906.
W. B. PEARSON & C. E. ROBERTS.
MECHANISM FOR FEEDING BARS OF STOCK.
APPLICATION FILED OCT. 18, 1904.
6 SHEETS—SHEET 6.
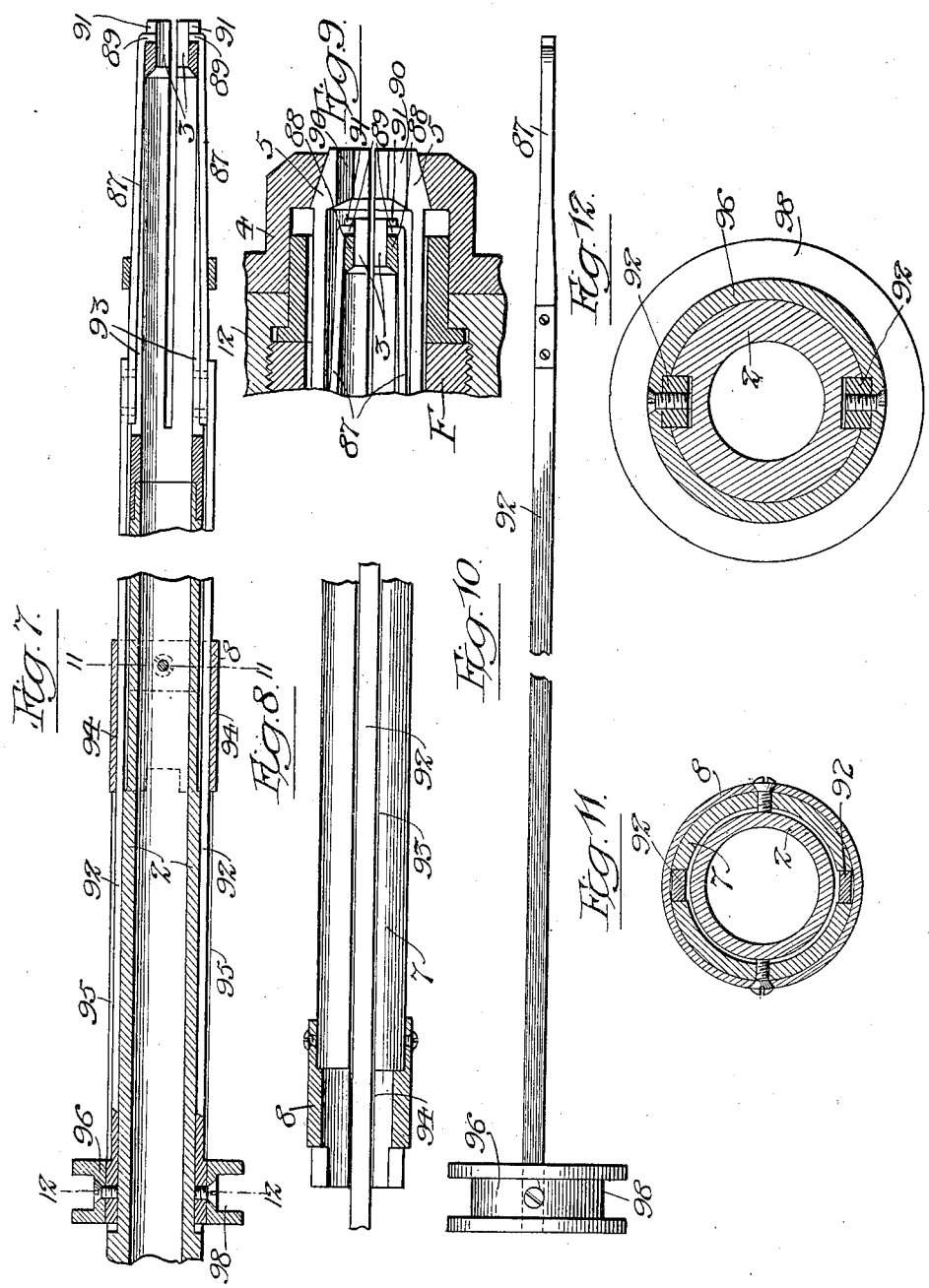
Witnesses:—
Inventors:
Walter B. Pearson
Charles E. Roberts
by
atty.

UNITED STATES PATENT OFFICE.

WALTER B. PEARSON, OF DETROIT, MICHIGAN, AND CHARLES E. ROBERTS, OF OAK PARK, ILLINOIS, ASSIGNORS TO STANDARD SCREW COMPANY, OF DETROIT, MICHIGAN, A CORPORATION OF NEW JERSEY.

MECHANISM FOR FEEDING BARS OF STOCK.

No. 827,660.     Specification of Letters Patent.     Patented July 31, 1906.

Original application filed May 9, 1902, Serial No. 106,620. Divided and this application filed October 18, 1904. Serial No. 229,031.

*To all whom it may concern:*

Be it known that we, WALTER B. PEARSON, a resident of Detroit, Wayne county, Michigan, and CHARLES E. ROBERTS, a resident of Oak Park, Cook county, Illinois, citizens of the United States, have invented certain new and useful Improvements in Mechanism for Feeding a Bar of Stock, of which the following is a specification.

This invention relates to an improved mechanism for feeding a bar of stock, and relates particularly to that type of stock-feeding mechanism commonly known as a "wire-feed."

This application is filed as a division of an application heretofore filed by us in the Patent Office on the 9th day of May, 1902, Serial No. 106,620, in which a stock-feeding mechanism of our invention is fully shown and described, but is not therein separately claimed.

A primary object of the invention is to provide a stock-feeding mechanism which will be uniform and accurate in its operation and which may be quickly and conveniently set for different feeds.

To this end our invention consists of the various features, combinations of features, and details of construction hereinafter described and claimed.

Figure 1:
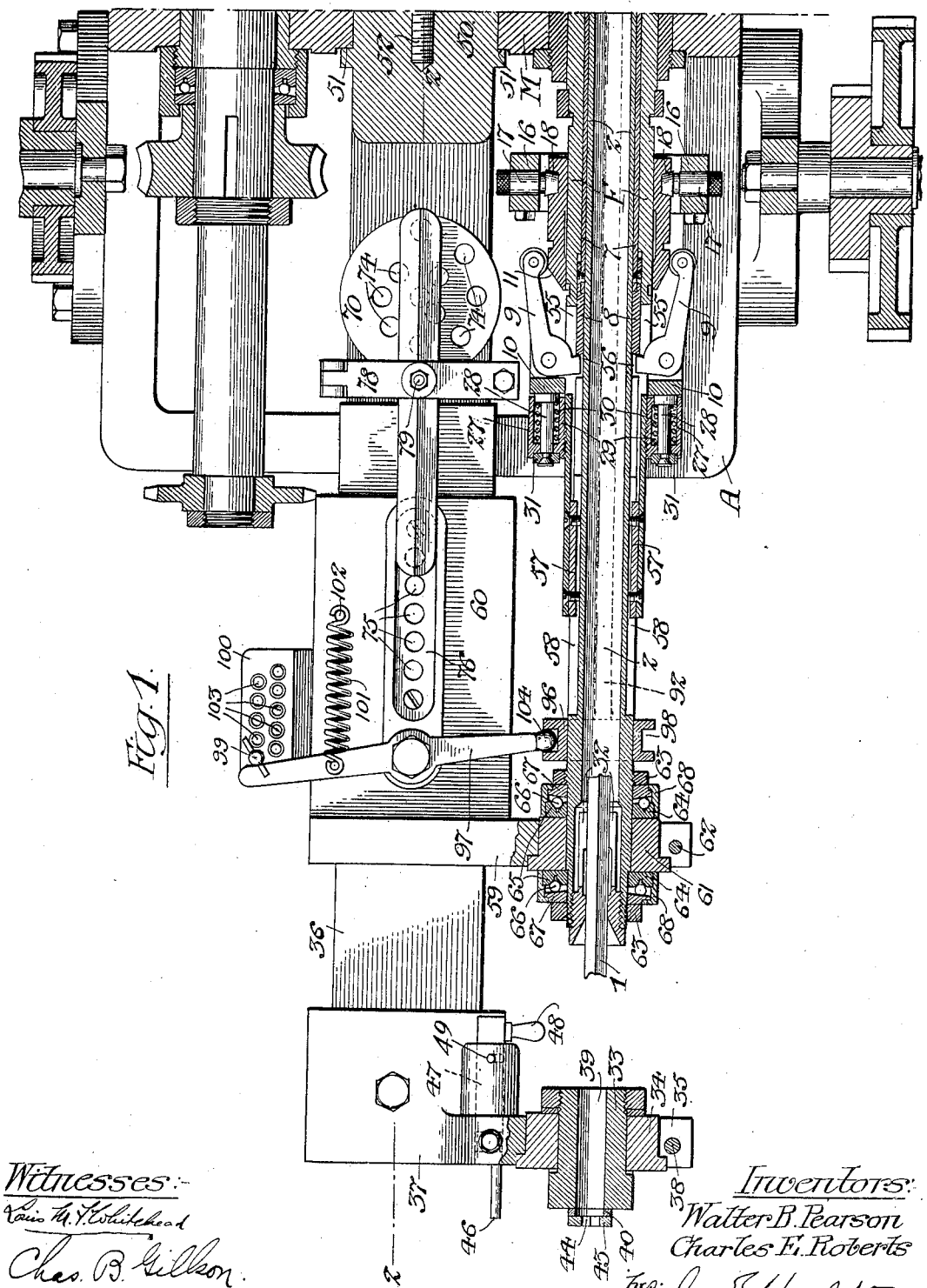
Figure 2:
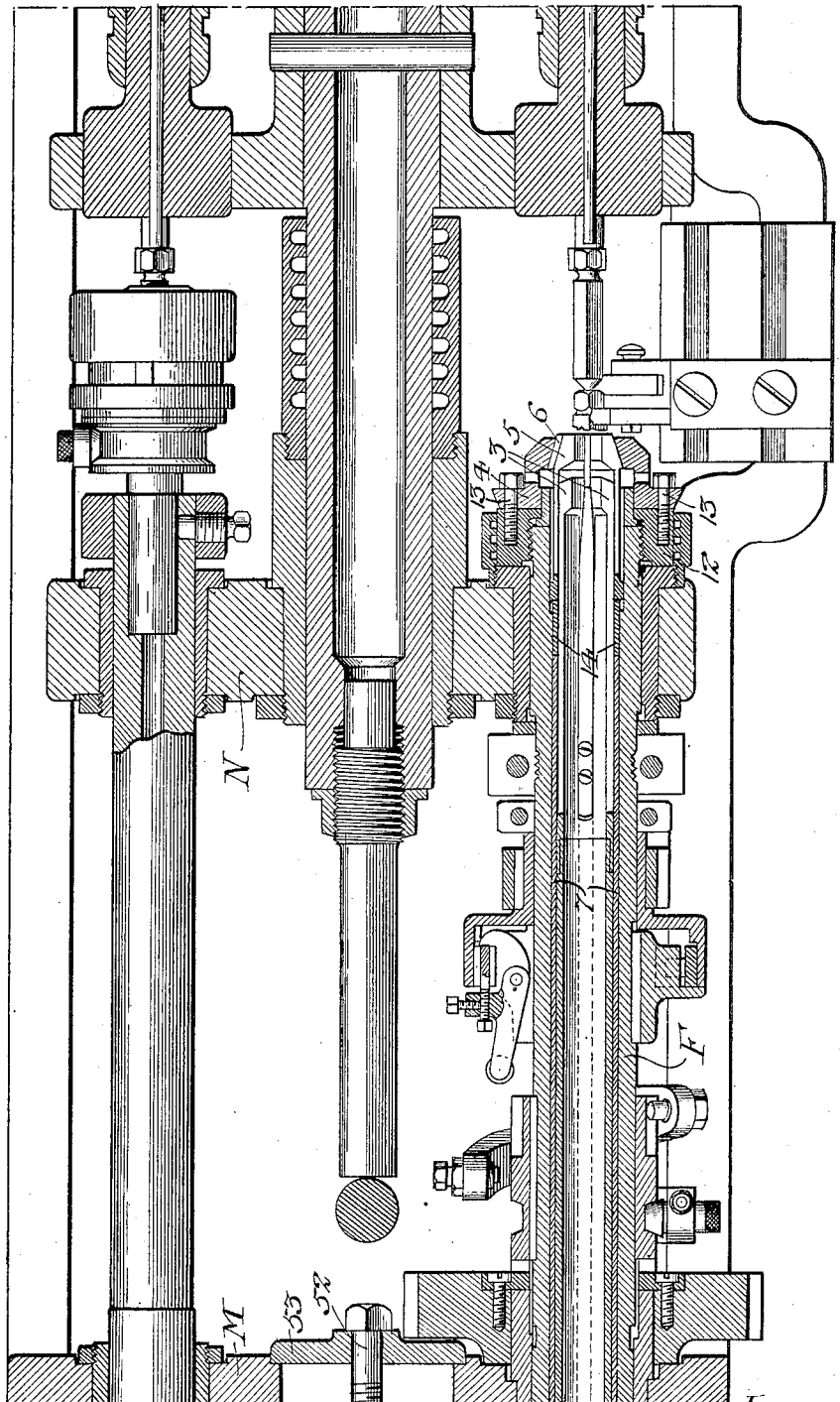
Figure 3:
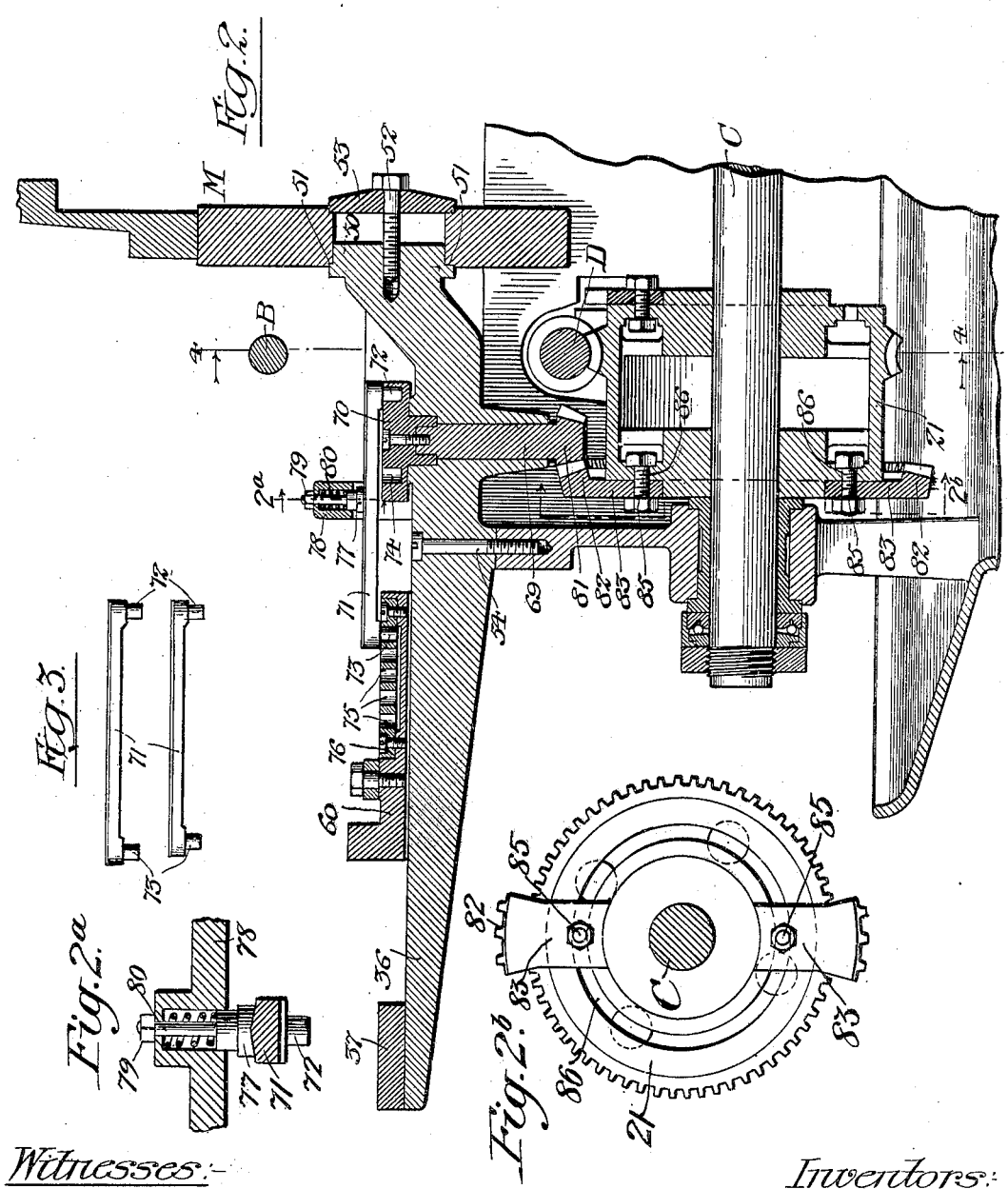
Figure 4:
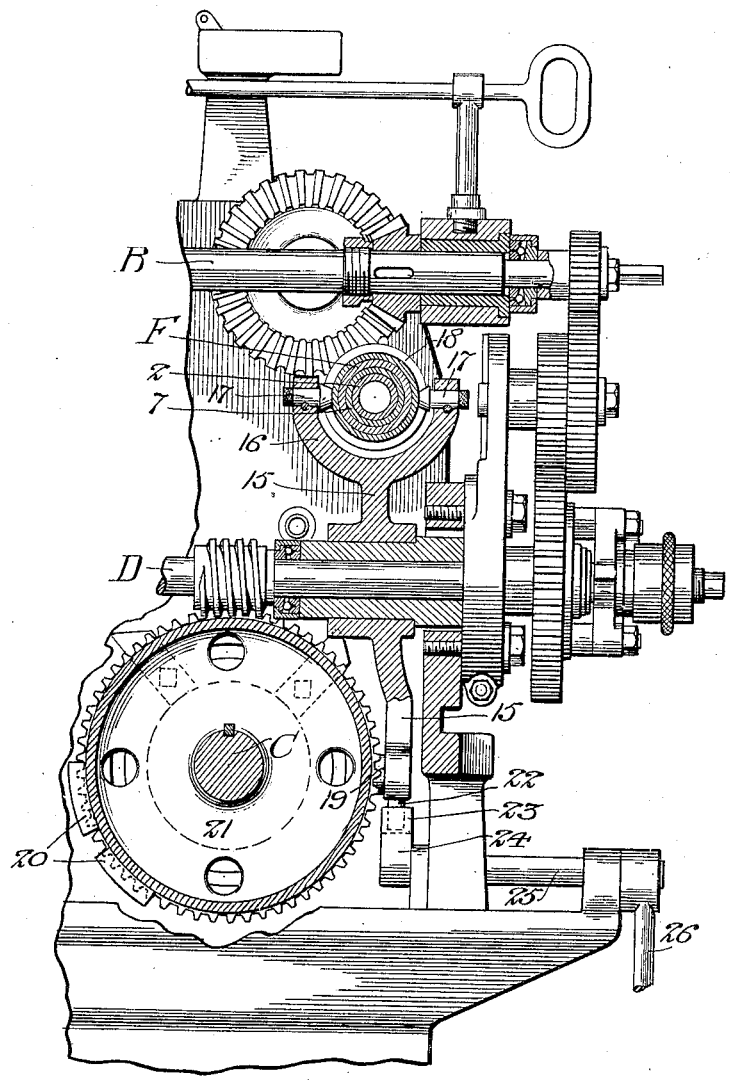

In the accompanying drawings, in which a stock-feed of our invention is fully illustrated, Figures 1 and 1ª together form a partial plan section showing a wire-feed of our invention applied to the stock-spindle of the screw-machine shown and described in said application, Serial No. 106,620. Fig. 2 is a partial vertical longitudinal sectional view thereof on the line 2 2 of Fig. 1. Figs. 2ª and 2ᵇ are detail sectional views on the lines 2ª and 2ᵇ, respectively, of Fig. 2. Fig. 3 is a detail view. Fig. 4 is a partial vertical transverse sectional view on the line 4 4 of Fig. 2. Figs. 5 and 6 are enlarged views of the stock-retaining device of the auxiliary feed, and Figs. 7 to 12, inclusive, are enlarged detail views of the ejector-fingers, Figs. 11 and 12 being sectional views taken on the lines 11 11 and 12 12, respectively, of Fig. 7.

As shown in the drawings, our improved stock-feeding mechanism is embodied in a machine for making metal screws, fully shown and described in said application, Serial No. 106,620, filed May 9, 1902, of which the present application is a division and to which reference is made as to features herein shown, but not fully described.

Referring now to the drawings, A designates the bed of the screw-machine, revolubly mounted in suitable bearings in transverse bridges M and N of which is the stock-spindle F.

The stock-spindle F is hollow and the bar of stock, partially shown at 1, is fed therethrough by means of a wire-feed, which, as regards its general features, is of the familiar type comprising a feed-tube 2, provided with spring-jaws 3 on its front end adapted to grip the bar of stock with sufficient force to impart movement thereto with said feed-tube when said bar of stock is free to move therewith.

The stock-spindle F is also provided with a stock-chuck adapted to secure the bar of stock in said spindle against movement relatively thereto. As shown, said chuck is of the type comprising a chuck-body 4, secured to the end of the spindle, a split chuck-collet 5 preferably secured against rotation relatively to the chuck-body 4 by a key 6, a plunger 7, a butt-ring 8, secured to the rear end of said plunger, bell-levers 9, pivoted in a collar 10 on the stock-spindle, the short arms of which bear against the rear end of the butt-ring 8, a wedge 11, which is longitudinally movable on the stock-spindle and is adapted to force the long arms of the bell-levers 9 outwardly and thereby force the plunger 7 forward, which will in turn force the chuck-collet 5 into the taper of the chuck-ring 4 and clamp said collet upon the bar of stock.

As hereinafter described, the end of the bar of stock is preferably fed to a fixed point through and beyond the stock-spindle F without regard to the length of the feed. With this construction, if a single chuck were used proportioned for a maximum feed, it is obvious that, when set for a shorter feed the cut-off tool (not shown) would be operating on the bar of stock at a considerable distance from said chuck and that the bar of stock would not be held as stiff and rigid as though said cut-off tool was operating in close proximity to said stock-chuck, thereby increasing the liability of said bar of stock catching on said tools, which would tend to break said tools or cause them to chatter. Thus in cutting off one (1) inch blanks with a stock-chuck proportioned for two (2) inch blanks the cut-off tool would be operating at a distance of considerably more than one (1) inch from said chuck, which would render the bar of stock very unsteady and the cut-off tool very liable to catch and chatter. To remedy this objectionable feature, provision is made for changing the chuck-bodies in order that a longer or shorter chuck may be used as it is desired to set the device for a shorter or longer feed, a chuck of such length being used that it will grip and support the bar of stock in desired proximity to the cut-off tool. In the preferable construction shown the chuck-body 4 instead of being threaded to the end of the stock-spindle F is bolted to a ring 12, threaded to the end of the stock-spindle in fixed adjustment. Forming said ring 12 separate from the stock-spindle F is a construction of economy and convenience of manufacture only. Otherwise a collar formed integral with said spindle could be used equally well. With this construction it is obvious that it will require very little time and will involve very little trouble to change the chuck-bodies, and also by disposing the key 6 and the attaching-bolts 13 in all of said chuck-bodies in the same positions relatively to the hole through the chuck-collet 5 the bar of stock will always be held in the same position relatively to the stock-spindle.

Obviously when the length of the chuck-body is varied the length of the chuck-collet 5 will have to be varied correspondingly. In practice we have usually done this by inserting a ring 14 of desired length between the rear end of said chuck-collet 5 and the front end of the plunger 7.

Movement longitudinally of the spindle F to lock and release the bell-levers at predetermined intervals is imparted to the wedge 11 by means of a lever 15, pivoted upon the machine frame, in the following manner: Formed on the upper end of said lever 15 is a yoke 16, secured in which are pins 17, the inner ends of which engage a groove 18, formed in the surface of said wedge 11. Secured to the lower end of said lever 15 is a lateral projection 19, which engages cams 20 on a drum 21, secured to rotate with a shaft C, revolubly mounted in suitable bearings in the machine-frame, said cams 20 operating to impart movement to said lever 15, and thus to the wedge 11 in opposite directions, in the desired manner. As shown, the projection 19 on the lever 15 comprises an antifriction-roller revolubly mounted on a stud rigidly secured in said lever 15.

The wedge 11 is adapted to be manually operated when desired in the following manner: Formed on the lower end of the lever 15 is a tooth or lug 22, which projects into the path of travel of shoulders 23 on a block 24, secured to a shaft 25, revolubly mounted in suitable bearings in the machine-frame. Rotation may be imparted to the shaft 25 to move the lever 15 to operate the wedge 11 by means of a hand-lever 26 secured thereto.

Instead of being rigidly secured to the spindle F the collar 10 is supported in yielding adjustment thereon in the following manner: Threaded to said spindle F in the rear of said collar 10 is a ring 27, in which are mounted spring-plungers 28, the forward ends of which project beyond the face of said ring and abut against the rear face of the collar 10. As shown, said plungers 28 are fitted to and are longitudinally movable in holes or sockets 29, formed in said ring 27, and coil-springs 30 are inserted between the heads of said plungers and the rear ends of said holes or sockets, surrounding the shanks of said plungers as guides. As shown, also, the rear ends of the shanks of said plungers 28 project through holes or openings in the rear side of said ring 27, and secured thereto are washers 31, which limit the movement of said plungers under the influence of the springs 30. The springs 30 are sufficiently strong to insure the designed operation of the bell-levers 9 and adjunctive parts under normal conditions. If, however, excessive resistance is offered to the movement of the parts actuated by the bell-levers 9, as should the bar of stock run uneven, being larger in diameter in some parts than in others, or should chips become lodged between the engaging surfaces of the chuck-body 4 and of the chuck-collet 5, either of which might prevent the edsigned operation of the machine or might even subject parts thereof to a strain which would break them, said springs 30 will be compressed, allowing the machine to go through its regular cycle without undue strain on any of its parts and without blocking the machine.

The relation and adjustment of parts is such that the chuck-collet 5 will be closed when the feed-tube 2 is being retracted and will be opened when said feed-tube is advanced. The bar of stock will thus be held against rearward movement with said feed-tube and will be fed forward by and with said feed-tube.

In the preferable construction shown, also, spring-jaws 32, substantially like and adapted to grip the bar of stock in the same manner as the jaws 3 on the forward end of the feed-tube 2, are secured in the rear end of said feed-tube. These jaws are for the purpose of feeding the bar of stock before it reaches said jaws 3, thus providing for starting a bar of stock into the machine as soon as the rear end of the bar on which the machine is operated passes said jaws 32. Located in the rear of the feed-tube is a retaining device which operates in connection with the jaws 32 and prevents the bar of stock from being retracted with said jaws before it reaches the collet 5. In the preferable construction shown said retaining device consists of a sleeve 33, revolubly secured against longitudinal movement in a bushing 34, secured in an arm 35 on a rearward extension 36 of the machine-frame, said arm 35 being preferably formed on a plate or saddle 37, removably secured to said rearward extension 36 of the machine-frame. As shown, also, the arm 35 is split at the outer side of the opening formed therein to receive the bushing 34 and is adapted to be clamped upon said bushing to secure it therein by means of a clamping-screw 38. Formed through the sleeve 33 is a hole 39, adapted to allow the bar of stock to pass through it freely. Hinged or pivoted at one end to the rear face of the sleeve 33 and at one side of the hole or opening 39 therein, so that it will extend across said hole and its free end will be movable toward and from the face of said sleeve 33, is a plate 40. A spring 41, inserted between said plate and the face of the sleeve 33, operates to force the free end of the plate 40 away from the face of the sleeve 33, suitable means operating to limit the movement of the free end of said plate 40 under the influence of said spring. As shown, said plate 40 is pivoted upon a stud or bolt 42, the head of which forms a stop limiting the movement of the plate 40 under the influence of the spring 41 in the desired manner. A hardened-steel die 43 is preferably secured to the rear side of the plate 40. Formed in the plate 40 and the die 43 is an opening 44, which registers with the hole 39 in the sleeve 33, the section of said opening formed in said die 43 being of the same shape and slightly larger than the bar of stock which the device is designed to feed and the section of said hole formed in the plate 40 being somewhat larger than the section in the die 43. With this construction it is obvious that as the feed-tube is retracted the edges of the die 43 will bite upon the bar of stock 1 and will secure the same against rearward movement with said feed-tube. In the preferable construction shown, also, means are provided for securing the plate 40 in contact with the face of the sleeve 33 to prevent the die 43 from gripping the bar of stock when desired. As shown, said means consist of a catch or button 45, pivoted to the sleeve 33 and adapted to be turned so as to lock over the free end of said plate 40. As shown, also, means are provided for automatically releasing said catch when the machine is started, said means consisting of a pin 46, which projects into the path of travel of the catch 45, so that said catch will be turned by contact therewith a sufficient distance to release said plate. As shown, the pin 46 projects eccentrically from a rod 47, revolubly mounted in a suitable bearing in the slide or saddle 37 and adapted to be manually operated by means of a handle 48 and is adapted to be thrown into and out of the path of travel of said catch by properly turning said rod 47. The rod 47 is secured in its bearings and the rotary movement thereof is limited by means of a stud 49, which engages a suitable peripheral groove therein. The rearward extension 36 of the machine-frame preferably consists of a bracket removably secured thereto. As shown, said bracket is secured in position upon the bed of the machine in the following manner: Formed on the forward end of said bracket is a circular projection 50, at the base of which is a shoulder 51. The projection 50 is fitted to an opening formed in the bridge M on the frame and said projection is firmly secured in said hole or opening by means of a bolt 52, threaded into the end of said bracket, the head of which bears against a plate 53, which extends across said opening on the front side of the bridge M. Between its ends said bracket 36 rests upon the bed A and is rigidly secured thereto by means of a bolt 54.

The plunger 7 is connected to the stock-spindle F, so as to rotate therewith, by means of the bell-levers 9, the short arms of which extend through slots 55 in said stock-spindle and engage slots 56, formed in the rear end of the butt-ring 8. The feed-tube 2 is connected with the stock-spindle F, so as to rotate therewith, by means of keys 57, secured to said stock-spindle, which engage grooves 58, formed longitudinally in the feed-tube 2.

The feed-tube 2 is reciprocated to feed the bar of stock in the following manner: Said feed-tube is revolubly secured against longitudinal movement in the arm 59 on a slide or saddle 60, fitted to and longitudinally movable on suitable guides or ways formed on the bracket 36. As shown, the bearing for said feed-tube in said arm 59 is formed in a bushing 61, secured in said arm 59 in the same manner as the bushing 34 is secured in the arm 35, the arm 59 being split at the outer side of the opening therein to receive said bushing and being adapted to be clamped upon said bushing by means of a clamping-screw 62. As shown, also, said feed-tube is secured in fixed longitudinal adjustment in said bushing by means of nuts 63, threaded to said feed-tube on opposite sides of said bushing. As shown, also, ball-bearings are provided on both sides of said bushing, said ball-bearings consisting of rings 64, provided with V-shaped ball-races 65, which bear against the sides of said bushing. The balls 66 are confined in the ball-races 65 by means of disks 67, adapted to be forced against said balls with desired pressure by means of the nuts 63, which bear against the outer sides thereof. Preferably, also, thimbles 68 inclose the members of said ball-bearings at their edges, said thimbles being snugly fitted to the rings 64, whereby said thimbles will be secured in position and being loosely fitted to the disks 67 to allow said disks to rotate freely with the feed-tube.

Revolubly mounted in a suitable bearing in the bracket 36 is a stub-shaft 69, to the upper end of which is secured a crank or disk 70, which is connected to the slide or saddle 60 by means of a connecting rod or link 71, one end of which is pivoted to the crank or disk 70 eccentrically to its axis of rotation and the opposite end of which is pivoted to the slide or saddle 60. With this construction it is obvious that rotation of the crank or disk 70 will impart a reciprocating movement to the slide or saddle 60 and also that the eccentricity of the point of attachment of the link 71 to said crank or disk 70 will determine the travel of said slide or saddle, and thus the feeding of the stock.

As preferably constructed means are provided for changing the feed by varying the eccentricity of the point of attachment of the connecting rod or link 71 to the crank or disk 70. As shown, this is effected in the following manner: Secured in the connecting rod or link 71 are pins 72 and 73, of which the pin 72 is interchangeable in a series of holes 74, formed in the crank or disk 70 at different distances from its axis of rotation, and the pin 73 is interchangeable in a series of holes 75, formed in the slide or saddle 60, the hole 75 in the slide or saddle being preferably formed in a plate 76, removably secured to said slide or saddle, thus providing for hardening the same. The pins 72 and 73 are secured in the holes which they respectively engage by means of a spring-pressed shoe 77, supported in a bar 78, which passes said connecting rod or link 71.

As shown, the bar 78 is hinged to the bracket 36 at one side of said connecting rod or link and is bolted to said bracket at the other side of said connecting rod or link, thus making provision for quickly removing the bar when it is desired to change the feed. As shown, also, the shoe 77 is maintained in position in the bar 78 against the pressure of the spring applied thereto by a nut 79, threaded to the projecting end of the shank 80 of said shoe above said bar 78.

The upper surface of the connecting rod or link 71, upon which the shoe 77 bears, slopes from the middle toward both sides, and formed in the surface of said shoe, which bears upon said connecting rod or link, is a shallow V-shaped depression, the angle of which is substantially the same as the angle formed by the inclined surface on the back of said connecting rod or link. The V-shaped groove in the shoe 77 is in full engagement with the angular surface on the back of said connecting rod or link when said connecting rod or link is in its middle position—that is, when the slide or saddle 60 is at the ends of its travel—and forms a lock to secure said slide or saddle and the parts actuated thereby in their extreme positions.

Intermittent rotary movement through one hundred and eighty degrees is imparted to the stub-shaft 69 and to the disk 70, carried thereon, in the following manner: Formed on or secured to the lower end of said stub-shaft 69 is a bevel-gear 81, which is adapted to be engaged by segmental gears 82 on the cam-shaft C, the relation of parts being such that each of said segmental gears will rotate said bevel-gear 81 through one hundred and eighty degrees, or one-half of a revolution, and will leave the teeth of said bevel-gear in proper position to be engaged by the teeth of the following segmental gear 82. Desired movement will be imparted to said stub-shaft and disk by the use of a bevel-gear 81, containing eight teeth, and segments 82, containing three teeth each.

The relation of parts is such that in positions of rest—that is, when the segmental gears 82 are out of engagement with the bevel-gear 81—the slide or saddle 60 will be at one limit or the other of its movement, or, in other words, such that the hole 74 with which the pin 72 is in engagement, being the crank-pin of the crank or disk 70, will be at its extreme throw on one side or the other of the axis of revolution of said crank or disk. With the described construction, there being eight teeth in the gear 81, this can be affected by locating the holes 74 on radial lines located forty-five (45) degrees from each other.

With the described construction it is obvious that the feed of the device may be varied by changing the pin 72 from the hole 74, with which it is in engagement, to another hole 74, farther from or nearer to the axis of revolution of the crank or disk 70, as it is desired to increase or decrease the feed. Changing the pin 72 from one hole 74 to another will operate to vary the travel of the slide or saddle 60 symmetrically on both sides of a central point, and when it is desired that the end of the bar of stock shall always be fed to the same point through the stock-spindle this can be effected by changing the pin 73 from the hole 75, with which it is in engagement, to one farther forward when it is desired to increase the feed or to one farther back when it is desired to decrease the feed. As shown, there are ten holes 74 in the crank or disk 70 and only five in the slide or saddle 60, the holes in said slide or saddle corresponding to alternate holes in said crank or disk. This is due to the fact that with desired fineness of feed the holes 75 in said slide or saddle would run into each other if a hole 75 were provided for each hole 74. In practice, therefore, we have used two bars 71 of different lengths, one of said bars being longer than the other by an amount equal to one-half the distance between adjacent holes 75. In Fig. 3 bars 71 for effecting different feeds are shown.

As shown, the segmental gears 82 are formed on plates or arms 83, the inner ends of which are fitted to a circular shoulder formed on the drum 21 on the cam-shaft C and which are secured to said drum by means of nuts threaded to the ends of bolts 85, the heads of which engage a circular T-slot 86, formed in said drum. Provision is thus made for adjusting said segmental gears circumferentially of the shaft C to vary the times of actuating the stub-shaft 60 and the parts controlled thereby to cause the same to work in desired relation to other parts coöperating therewith.

In addition to the feed-tube 2 the stock-spindle F is provided with what may be designated as "ejector-fingers" 87, which are adapted to discharge short pieces of stock from the stock-chuck. As shown, said ejector-fingers are fitted to and are longitudinally movable in suitable slots in the feed-jaws 3.

The ejector-fingers 87 are preferably resilient and are adapted to spring inwardly toward each other when free to do so, so that the distance between their forward ends will be less than the diameter of the bar of stock. Suitable stops on the feed-jaws 3 limit the inward movement of said ejector-fingers and also operate to spring said ejector-fingers apart when said feed-jaws are expanded by inserting a bar of stock therethrough. As shown, said stops consist of unsevered portions 88 of the feed-jaws 31, which bridge the slots in which said ejector-fingers are confined. In order that the ejector-fingers 87 will extend inwardly a desired distance, the extreme forward ends 89 thereof are turned inwardly toward each other, the lengths of said inwardly-turned ends 89 being such that when the ejector-fingers 87 are in contact with the stops 88 on the feed-jaws 3 they will terminate just outside of the hole or opening through said feed-jaws and will be held out of contact with the bar of stock in said feed-jaws. The forward ends of said ejector-fingers are adapted to play through slots 90 in the chuck-collet 5, so that when in their extreme forward positions they will project beyond the end of said collet. When in their rearward positions, the inwardly-turned ends 89 of said ejector-fingers 87 enter slots 91 in the feed-jaws 3, thus providing for retracting said ejector-fingers rearwardly beyond the forward ends of said feed-jaws. With this construction it is obvious that when the feed-jaws 3 are retracted beyond the end of a piece of stock secured in the stock-chuck both said feed-jaws and the ejector-fingers will spring inwardly behind said piece of stock. It is also obvious that as said feed-jaws and ejector-fingers are again advanced the piece of stock will be forced forward, first by the feed-jaws 3 and after they have reached their forward positions by the ejector-fingers 87, which will operate to eject said piece of stock from the stock-chuck. With this construction it is obvious that said ejector-fingers will play idly back and forth as long as the feed-jaws 3 are in engagement with a bar of stock. When, however, said bar of stock becomes so short that the feed-jaws 3 are retracted beyond the rear end thereof, they, together with the ejector-fingers, will spring inwardly behind said piece of stock and operating thereon successively in the manner heretofore described will eject said piece of stock from the stock-chuck. The duty imposed on said ejector-fingers will thus be very slight and the danger of breaking them very slight.

The rear ends of the ejector-fingers 87 are attached to rods 92, which are fitted to and are longitudinally movable in slots 93 in the plunger 7 and in grooves 94, formed in the inner surface of the butt-ring 8, and grooves 95, formed on the exterior of the feed-tube 2. The rear ends of the rods 92 are secured to a ring 96, fitted to and longitudinally movable on the feed-tube 2, and movement longitudinally of said tube to impart desired movement to the ejector-fingers is imparted to said ring in the following manner: Pivoted upon the slide or saddle 60 is a lever 97, one end of which engages a groove 98, formed in the ring 96. As the slide or saddle 60, carrying the feed-tube 2, moves forward to feed the bar of stock the opposite end of the lever 97 strikes a pin 99, secured in a bracket 100 on the rearward extension 36 of the machine-frame. A differential movement relatively to the feed-tube 2 and in the same direction will thus be imparted to the ejector-fingers, and the relation of parts is such that when the feed-jaws 3 on the feed-tube 2 are at the forward limit of their movement said ejector-fingers will project beyond the end of the chuck-collet 5. A suitable stop limits the rearward movement of the ejector-fingers 87 relatively to the feed-jaws 2, so that said ejector-fingers will be retracted only a short distance back of the forward ends of said feed-jaws. As shown, said stop is formed by the bearing of the feed-tube 2 in the arm 59 on the slide or saddle 60, with which the ring 96 is adapted to come into contact when the ejector-fingers 87 have been retracted a desired distance relative to the feed-jaws 3. A spring 101, one end of which is attached to the lever 97 and the other to a pin 102 or other suitable support on the slide or saddle 60, is adapted to impart pivotal movement to said lever to retract said ejector-fingers relatively to the feed-tube 2. Said spring also provides for bodily rearward movement of the lever 97 with the slide or saddle 60 after the ring 96 strikes the bearing-box of the feed-tube in the arm 59. In order to vary the movement of the ejector-fingers 87 to provide for adjusting the device for a longer or shorter feed, the pin 99 is interchangeable in a series of holes 103 in the bracket 100, disposed longitudinally of the machine, there being a hole 103 corresponding to each hole 74 in the crank or disk 70. In the preferable construction shown also an antifriction-roller 104 is mounted on the free end of the lever 97, the edges of said roller being rounded, so that it will fit the groove 98 in the ring 96 in all positions of said lever.

Rotation is imparted to the stock-spindle F and cam-shaft C by means of driving connection with a source of power, as shown, by suitable driving connection with a power-shaft B. As regards the present invention, however, any desired or approved form of driving connection may be employed which could readily be supplied by any skilled mechanic. Reference is made, however, to the main application, Serial No. 106,620, in which specific means for this purpose are fully shown and described.

We claim as our invention—

1. The combination with a stock-spindle, of a stock-chuck and a wire-feed applied thereto, said wire-feed comprising a feed-tube, means to operate said chuck and means to impart reciprocating movement to the feed-tube of said wire-feed, said means comprising a slide in which said feed-tube is revolubly secured, a crank or disk, a rod or bar connected to said slide and adapted to be connected to said crank or disk at different distances from its axis of rotation and on different radial lines thereof and means to impart step-by-step rotation to said crank or disk, the relation being such that during periods of rest of said crank or disk the point of attachment of said connecting rod or bar to said crank or disk will be at a dead-point.

2. The combination with a stock-spindle, of a stock-chuck and a wire-feed applied thereto, said wire-feed comprising a feed-tube, means to operate said chuck and means to impart reciprocating movement to the feed-tube of said wire-feed, said means comprising a slide in which said feed-tube is revolubly secured, a crank or disk, a rod or bar connected to said slide and adapted to be connected to said crank or disk at different distances from its axis of rotation and on different radial lines, a shaft to which said crank or disk is secured, a gear on said crank-shaft, a driven shaft and a segmental gear or gears on said driven shaft adapted to engage the gear on said crank-shaft, the angular distances between the radial lines passing through the different points for the attachment of said connecting-rod to said crank or disk being equal to or a multiple of three hundred and sixty degrees divided by the number of teeth in the gear on said crank-shaft.

3. The combination with a stock-spindle, of a stock-chuck and a wire-feed applied thereto, said wire-feed comprising a feed-tube, means to operate said chuck and means to impart reciprocating movement to the feed-tube of said wire-feed, said means comprising a slide in which said feed-tube is revolubly secured, a crank or disk provided with a plurality of holes at different distances from its axis of rotation, a rod or bar connected to said slide, a pin thereon interchangeable in the holes in said crank or disk, a shaft to which said crank or disk is secured, a gear on said crank-shaft, a driven shaft and a segmental gear or gears on said driven shaft which engage the gear on said crank-shaft, the holes in said crank or disk being arranged on radial lines the angular distances between which are equal to or a multiple of three hundred and sixty degrees divided by the number of teeth in the gear on said crank-shaft.

4. The combination with a stock-spindle, of a stock-chuck and a wire-feed applied thereto, said wire-feed comprising a feed-tube, means to operate said chuck and means to impart reciprocating movement to the feed-tube of said wire-feed, said means comprising a slide in which said feed-tube is revolubly secured, a crank or disk, a rod which connects said slide with said crank or disk, means for connecting said rod to said slide at different points longitudinally thereof and to said crank or disk at different distances from its axis of rotation and means to rotate said crank or disk.

5. The combination with a stock-spindle, of a stock-chuck and a wire-feed applied thereto, said wire-feed comprising a feed-tube, means to operate said chuck and means to impart reciprocating movement to the feed-tube of said wire-feed, said means comprising a slide in which said feed-tube is revolubly secured, a crank or disk, a rod which connects said slide with said crank or disk, means for connecting said rod to said slide at different points longitudinally thereof and to said crank or disk at different distances from its axis of rotation, a shaft to which said crank or disk is secured, a gear on said crank-shaft, a driven shaft and a segmental gear or gears on said driven shaft which engage the gear on said crank-shaft.

6. The combination with a stock-spindle, of a stock-chuck and a wire-feed applied thereto, said wire-feed comprising a feed-tube, means to operate said chuck and means to impart reciprocating movement to the feed-tube of said wire-feed, said means comprising a slide in which said feed-tube is revolubly secured provided with a plurality of holes arranged lengthwise thereof, a crank or disk provided with a plurality of holes at different distances from its axis of rotation, a rod or bar, pins thereon interchangeable in the holes in said slide and in said crank or disk and means to rotate said crank or disk.

7. The combination with a stock-spindle, of a stock-chuck and a wire-feed applied thereto, said wire-feed comprising a feed-tube, means to operate said chuck and means to impart reciprocating movement to the feed-tube of said wire-feed, said means comprising a slide in which said feed-tube is revolubly secured provided with a plurality of holes arranged lengthwise thereof, a crank or disk provided with a plurality of holes at different distances from its axis of rotation, a rod or bar, pins thereon interchangeable in the holes in said slide and in said crank or disk, a shaft in which said crank or disk is secured, a gear on said crank-shaft, a driven shaft and a segmental gear or gears on said driven shaft which engage the gear on said crank-shaft.

8. The combination with a stock-spindle, of a stock-chuck and a wire-feed applied thereto, said wire-feed comprising a feed-tube, means to operate said chuck and means to impart reciprocating movement to the feed-tube of said wire-feed, said means comprising a slide in which said feed-tube is revolubly secured provided with a plurality of holes arranged lengthwise thereof, a crank or disk provided with a plurality of holes at different distances from its axis of rotation, a rod or bar, pins thereon interchangeable in the holes in said slide and in said crank or disk, a shaft to which said crank or disk is secured, a gear on said crank-shaft, a driven shaft and a segmental gear or gears on said driven shaft which engage the gear on said crank-shaft, the holes in said crank or disk being arranged on radial lines the angular distances between which are equal to or a multiple of three hundred and sixty degrees divided by the number of teeth in the gear on said crank-shaft.

9. The combination with a stock-spindle, of a stock-chuck and a wire-feed applied thereto, said wire-feed comprising a feed-tube, means to operate said chuck and means to impart reciprocating movement to the feed-tube of said wire-feed, said means comprising a slide in which said feed-tube is revolubly secured, a crank or disk, a rod or bar, pins thereon which are fitted to holes in said slide and in said crank or disk, a bar which extends over said rod, a spring-pressed shoe in said bar which bears on said rod, a shaft to which said crank or disk is secured, a gear on said crank-shaft, a driven shaft and a segmental gear or gears on said driven shaft which engage the gear on said crank-shaft.

10. The combination with a stock-spindle, of a stock-chuck and a wire-feed applied thereto, said wire-feed comprising a feed-tube, means to operate said chuck and means to impart reciprocating movement to the feed-tube of said wire-feed, said means comprising a slide in which said feed-tube is revolubly secured, a crank or disk, a rod, pins thereon which are interchangeable in a series of holes in said slide and in said crank or disk, a bar which extends over said rod, a spring-pressed shoe in said bar which bears on said rod, a shaft to which said crank or disk is secured, a gear on said crank-shaft, a driven shaft and a segmental gear or gears on said driven shaft which engage the gear on said crank-shaft.

11. The combination with a stock-spindle, of a stock-chuck and a wire-feed applied thereto, said wire-feed comprising a feed-tube, means to operate said chuck, means to impart reciprocating movement to the feed-tube of said wire-feed, said means comprising a slide in which said feed-tube is revolubly secured, a crank or disk, a rod which connects said crank or disk with said slide, a shaft to which said crank or disk is secured, a gear thereon, a driven shaft, a segmental gear or gears on said driven shaft which engage the gear on said crank-shaft and means to lock said slide against movement between engagements of said segmental gear or gears with the gear on said crank-shaft.

12. The combination with a stock-spindle, of a stock-chuck and a wire-feed applied thereto, said wire-feed comprising a feed-tube, means to operate said chuck, means to impart reciprocating movement to the feed-tube of said wire-feed, said means comprising a slide in which said feed-tube is revolubly secured, a crank or disk, connection between said slide and said crank or disk whereby rotation of said crank or disk will impart reciprocating movement to said slide, a shaft to which said crank or disk is secured, a gear on said crank-shaft, a driven shaft, a segmental gear or gears on said driven shaft which engage the gear on said crank-shaft and means to lock said slide in position between successive engagements of said segmental gear or gears with the gear on said crank-shaft.

13. The combination with a stock-spindle, of a stock-chuck and a wire-feed applied thereto, said wire-feed comprising a feed-tube, means to operate said chuck, means to impart reciprocating movement to the feed-tube of said wire-feed, said means comprising a slide in which said feed-tube is revolubly secured, a crank or disk, a rod which connects said slide with said crank or disk, a bar which extends over said rod, a spring-pressed shoe in said bar which bears on said rod, the surface of said rod engaged by said shoe being angular in cross-section and said shoe being provided with a corresponding recess, a shaft to which said crank or disk is secured, a gear on said crank-shaft, a driven shaft and a segmental gear or gears on said driven shaft which engage the gear on said crank-shaft.

14. The combination with a stock-spindle, of a stock-chuck and a wire-feed applied thereto, said wire-feed comprising a feed-tube, means to operate said chuck, means to impart reciprocating movement to the feed-tube of said wire-feed, said means comprising a slide in which said feed-tube is revolubly secured, a crank or disk, operative connection between said crank or disk and said slide whereby rotation of said crank or disk will impart reciprocating movement to said slide, a shaft to which said crank or disk is secured, a gear on said crank-shaft, a driven shaft and a segmental gear or gears on said driven shaft which engage the gear on said crank-shaft.

15. The combination with a stock-spindle, of a stock-chuck and a wire-feed applied thereto, said wire-feed comprising a feed-tube, means to operate said chuck, means to impart reciprocating movement to the feed-tube of said wire-feed, ejector-fingers which project inwardly through slots formed in the spring-jaws of the feed-tube of the wire-feed which register with slots in the stock-chuck and means to impart reciprocating movement to said ejector-fingers.

16. The combination with a stock-spindle, of a stock-chuck and a wire-feed applied thereto, said wire-feed comprising a feed-tube, means to operate said chuck, means to impart reciprocating movement to the feed-tube of said wire-feed, ejector-fingers which project inwardly through slots in the spring-jaws of the feed-tube of said wire-feed which register with slots in the stock-chuck and means controlled by the feed-tube-operating mechanism for imparting reciprocating movement to said ejector-fingers.

17. The combination with a stock-spindle, of a stock-chuck and a wire-feed applied thereto, said wire-feed comprising a feed-tube, means to operate said chuck, means to impart reciprocating movement to the feed-tube of said wire-feed, rods fitted to and longitudinally movable in grooves formed in the chuck-plunger and in the wire-feed tube, ejector-fingers on said rods which project inwardly through slots in the spring-jaws of the wire-feed tube which register with slots in the stock-chuck and means for imparting reciprocating movement to said rods.

18. The combination with a stock-spindle, of a stock-chuck and a wire-feed applied thereto, said wire-feed comprising a feed-tube, means to operate said chuck, a slide in which the feed-tube of said wire-feed is revolubly secured, means to impart reciprocating movement to said slide, rods fitted to and longitudinally movable in grooves formed in the chuck-plunger and in the feed-tube of the wire-feed, ejector-fingers on said rods which project inwardly through slots formed in the spring-jaws of the wire-feed tube which register with slots in the stock-chuck, a sleeve on said feed-tube to which said rods are secured, a lever pivoted upon the slide in which the feed-tube is secured, one end of which is connected to the ejector-sleeve and a stop which forms a fulcrum for the opposite end of said lever.

19. The combination with a stock-spindle, of a stock-chuck and a wire-feed applied thereto, said wire-feed comprising a feed-tube, means to operate said chuck, a slide in which the feed-tube of said wire-feed is revolubly secured, means to impart reciprocating movement to said slide, rods fitted to and longitudinally movable in grooves formed in the chuck-plunger and in the feed-tube of the wire-feed, ejector-fingers on said rods the ends of which project inwardly through slots formed in the spring-jaws of said feed-tube which register with slots in the stock-chuck, a sleeve on the feed-tube to which the ejector-rods are secured, a lever pivoted on the feed-tube slide, connection between one end of said lever and the ejector-sleeve, a stop which projects into the path of travel of the opposite end of said lever as said slide advances, and a spring applied to said lever adapted to impart pivotal movement to said lever to retract said ejector-sleeve.

20. The combination with a stock-spindle, of a stock-chuck and a wire-feed applied thereto, said wire-feed comprising a feed-tube, means to operate said chuck, a slide in which the feed-tube of said wire-feed is revolubly secured, means to impart reciprocating movement to said slide, rods fitted to and longitudinally movable in grooves formed in the stock-chuck plunger and in the feed-tube of said wire-feed, ejector-fingers on said rods the ends of which project inwardly through slots formed in the spring-jaws of said feed-tube which register with slots in the stock-chuck, a sleeve on the feed-tube to which the ejector-rods are secured, means to impart reciprocating movement to said sleeve and a stop which limits the rearward movement thereof relatively to the feed-tube of the wire-feed.

21. The combination with a stock-spindle, of a stock-chuck and a wire-feed applied thereto, said wire-feed comprising a feed-tube, means to operate said chuck, a slide in which the feed-tube of said wire-feed is revolubly secured, means to impart reciprocating movement to said slide, rods fitted to and longitudinally movable in grooves formed in the chuck-plunger and in the feed-tube of the wire-feed, ejector-fingers on said rods the ends of which project inwardly through slots formed in the spring-jaws of said feed-tube which register with slots in the stock-chuck, a sleeve on the feed-tube to which the ejector-rods are secured, a lever pivoted upon the feed-tube slide, connection between one end of said lever and the ejector-sleeve, a stop which projects into the path of travel of the opposite end of said lever as said slide advances, and a stop which limits the rearward movement of said sleeve relatively to the feed-tube of the wire-feed.

22. The combination with a stock-spindle, of a stock-chuck and a wire-feed applied thereto, said wire-feed comprising a feed-tube, means to operate said chuck, a slide in which the feed-tube of said wire-feed is revolubly secured, means to impart reciprocating movement to said slide, rods fitted to and longitudinally movable in grooves formed in the chuck-plunger and in the feed-tube of said wire-feed, ejector-fingers on said rods the ends of which project inwardly through slots formed in the spring-jaws of said feed-tube which register with slots in the stock-chuck, a sleeve on the feed-tube to which the ejector-rods are secured, a lever pivoted upon the feed-tube slide, connection between one end of said lever and the ejector-sleeve, a stop which projects into the path of travel of the opposite end of said lever as said slide advances, a spring applied to said lever adapted to move the same pivotally to retract said sleeve and a stop which limits the rearward movement of said sleeve relatively to the feed-tube of the wire-feed.

23. The combination with a stock-spindle, of a stock-chuck and a wire-feed applied thereto, said wire-feed comprising a feed-tube, means to operate said chuck, a slide in which the feed-tube of said wire-feed is revolubly secured, means to impart reciprocating movement thereto, rods fitted to and longitudinally movable in grooves formed in the chuck-plunger and in the feed-tube of the wire-feed, ejector-fingers on said rods which project inwardly through slots formed in the spring-jaws of said feed-tube which register with slots in the stock-chuck, a grooved sleeve on said feed-tube to which the ejector-rods are secured, a lever pivoted upon the feed-tube slide, one end of which engages the groove formed in the ejector-sleeve and a stop which forms a fulcrum for the opposite end of said lever.

24. The combination with a stock-spindle, of a stock-chuck and a wire-feed applied thereto, said wire-feed comprising a feed-tube, means to operate said chuck, a slide in which the feed-tube of said wire-feed is revolubly secured, means to impart reciprocating movement thereto, means to vary the movement of said slide, rods fitted to and longitudinally movable in grooves formed in the chuck-plunger and in the feed-tube of said wire-feed, ejector-fingers on said rods which project inwardly through slots in the spring-jaws of the feed-tube in register with the slots in the stock-chuck, a sleeve on the feed-tube to which the ejector-rods are secured, a lever pivoted on the feed-tube slide, connection between one end of said lever and the ejector-sleeve and a stud or projection which forms a fulcrum for the opposite end of said lever, said stud or projection being interchangeable in a series of holes.

25. The combination with a stock-spindle, of a stock-chuck and a wire-feed applied thereto, said wire-feed comprising a feed-tube, means to operate said chuck, a slide in which the feed-tube of said wire-feed is revolubly secured, means to impart reciprocating movement thereto, means to vary the movement thereof, rods fitted to and longitudinally movable in grooves formed in the chuck-plunger and in the feed-tube of said wire-feed, ejector-fingers on said rods which project inwardly through slots formed in the spring-jaws of the feed-tube in register with slots in the stock-chuck, a sleeve on said feed-tube to which the ejector-rods are secured, a lever pivoted upon the feed-tube slide, connection between one end of said lever and the ejector-sleeve, a stop which projects into the path of travel of the opposite end of said lever as said slide advances, said stop being interchangeable in a series of holes and a spring applied to said lever adapted to move the same pivotally to retract said ejector-sleeve.

26. The combination with a stock-spindle, of a stock-chuck and a wire-feed applied thereto, said wire-feed comprising a feed-tube, means to operate said chuck, a slide in which the feed-tube of said wire-feed is revolubly secured, means to impart reciprocating movement thereto, means to vary the movement thereof, rods fitted to and longitudinally movable in grooves formed in the chuck-plunger and in the feed-tube of said wire-feed, ejector-fingers on said rods which project inwardly through slots in the spring-jaws of the feed-tube in register with slots in the stock-chuck, a sleeve on said feed-tube to which the ejector-rods are secured, a lever pivoted upon the feed-tube slide, connection between one end of said lever and the ejector-sleeve, a stop which projects into the path of travel of the opposite end of said lever as said slide advances, said stop being interchangeable in a series of holes, a spring applied to said lever adapted to move the same pivotally to retract said ejector-sleeve and a stop which limits the rearward movement of said sleeve relatively to the feed-tube of the wire-feed.

27. The combination with a stock-spindle, of a stock-chuck and a wire-feed applied thereto, said wire-feed comprising a feed-tube, means to operate said chuck, means to impart reciprocating movement to the feed-tube of said wire-feed, ejector-fingers which project inwardly through slots formed in the spring-jaws of said feed-tube in register with slots formed in the stock-chuck, stops which limit the inward movement of said ejector-fingers relatively to the spring-jaws of the wire-feed tube and means to impart reciprocating movement to said ejector-fingers.

28. The combination with a stock-spindle, of a stock-chuck and a wire-feed applied thereto, said wire-feed comprising a feed-tube, means to operate said chuck, means to impart reciprocating movement to the feed-tube of said wire-feed, ejector-fingers which project inwardly through slots formed in the spring-jaws of said feed-tube in register with slots formed in the stock-chuck, shoulders on said spring-jaws which limit the inward movement of said ejector-fingers relatively thereto and means to impart reciprocating movement to said ejector-fingers.

29. The combination with a stock-spindle, a stock-chuck and a primary wire-feed applied thereto, said wire-feed comprising a feed-tube, means to operate said chuck and means to impart reciprocating movement to the feed-tube of said wire-feed, of an auxiliary wire-feed, comprising spring-jaws secured in the feed-tube in the rear of the spring-jaws of the primary wire-feed, a fixed support in the rear of said feed-tube, a sleeve revolubly mounted in said support and means on said sleeve to prevent rearward movement of a bar of stock therethrough.

30. The combination with a stock-spindle, a stock-chuck and a wire-feed applied thereto, said wire-feed comprising a feed-tube, means to operate said chuck and means to impart reciprocating movement to the feed-tube of said wire-feed, of an auxiliary wire-feed comprising spring-jaws secured in the feed-tube of said wire-feed in the rear of the spring-jaws of the primary wire-feed, a fixed support in the rear of said feed-tube, a sleeve revolubly mounted therein provided with a hole adapted to receive a bar of stock, a plate pivoted to the rear face of said sleeve at one side of the hole therein and which extends across said hole, said plate being provided with a hole adapted to receive a bar of stock, a spring applied to said plate to force the free end thereof away from the face of said sleeve and a stop which limits the movement of said plate under the influence of said spring.

31. The combination with a stock-spindle, a stock-chuck and a wire-feed applied thereto, said wire-feed comprising a feed-tube, means to operate said chuck and means to impart reciprocating movement to the feed-tube of said wire-feed, of an auxiliary wire-feed, comprising spring-jaws secured in said feed-tube in the rear of the spring-jaws of the primary wire-feed, a fixed support in the rear of said feed-tube, a sleeve revolubly mounted in said support provided with a hole adapted to receive a bar of stock, a plate pivoted to the rear face of said sleeve at one side of the hole therein and which extends across said hole, said plate being provided with a hole adapted to receive a bar of stock, a spring applied to said plate to force the free end thereof away from the face of the sleeve, a stop which limits the movement of said plate under the influence of said spring, a catch or detent adapted to secure said plate in contact with the face of said sleeve, a pin for disengaging said detent from said plate and means to throw said pin into and out of the path of travel of said detent.

In testimony that we claim the foregoing as our invention, we affix our signatures, in presence of two subscribing witnesses, this 6th day of October, A. D. 1904.

WALTER B. PEARSON.
CHARLES E. ROBERTS.

Witnesses:
E. M. KLATCHER,
K. A. COSTELLO.